United States Patent

Quenneville et al.

(12) United States Patent
(10) Patent No.: US 8,029,263 B1
(45) Date of Patent: Oct. 4, 2011

(54) LOW PRESSURE VACUUM RESIN INFUSION SYSTEM

(76) Inventors: Marc A. Quenneville, Clearwater, FL (US); Stephen M. Quenneville, Clearwater, FL (US)

(*) Notice: Subject to any disclaimer, the term of this patent is extended or adjusted under 35 U.S.C. 154(b) by 325 days.

(21) Appl. No.: 12/505,153

(22) Filed: Jul. 17, 2009

Related U.S. Application Data

(63) Continuation-in-part of application No. 11/967,340, filed on Dec. 31, 2007, now Pat. No. 7,722,348.

(51) Int. Cl.
*B29C 70/48* (2006.01)

(52) U.S. Cl. ............ 425/121; 425/129.1; 425/388; 425/390; 425/394; 425/402; 425/434; 425/543; 425/DIG. 14

(58) Field of Classification Search ............ 425/121, 425/129.1, 388, 390, 394, 402, 425, 434, 425/460, 543, DIG. 14
See application file for complete search history.

(56) References Cited

U.S. PATENT DOCUMENTS

| | | | | | |
|---|---|---|---|---|---|
| 4,043,721 | A | * | 8/1977 | Lemelson | 425/116 |
| 4,632,654 | A | * | 12/1986 | Lemelson | 425/150 |
| 4,956,133 | A | * | 9/1990 | Payne | 425/435 |
| 5,393,215 | A | * | 2/1995 | Donovan, Sr. | 425/129.1 |
| 7,726,962 | B2 | * | 6/2010 | Aramburu et al. | 425/117 |
| 7,980,840 | B2 | * | 7/2011 | Burchardt et al. | 425/129.1 |

* cited by examiner

*Primary Examiner* — Richard Crispino
*Assistant Examiner* — Thukhanh Nguyen
(74) *Attorney, Agent, or Firm* — Ronald E. Smith; Smith & Hopen, P.A.

(57) ABSTRACT

A mold assembly includes a support table mounted for rotation within a vacuum chamber. A plurality of hollow part molds is radially disposed about an axis of rotation of the support table. Each part mold has fiber architecture disposed between an inflatable bladder and internal walls of the part mold. A first motor rotates the support table and resin is urged by centrifugal force to flow along the length of each part mold until the fiber architecture is thoroughly impregnated with resin. A second motor spins each part mold about an axis of rotation of the part mold to ensure that the resin migrates radially outwardly relative to the interior wall surface of each part mold. The resulting product is a monolithic, seamless part having no voids.

15 Claims, 14 Drawing Sheets

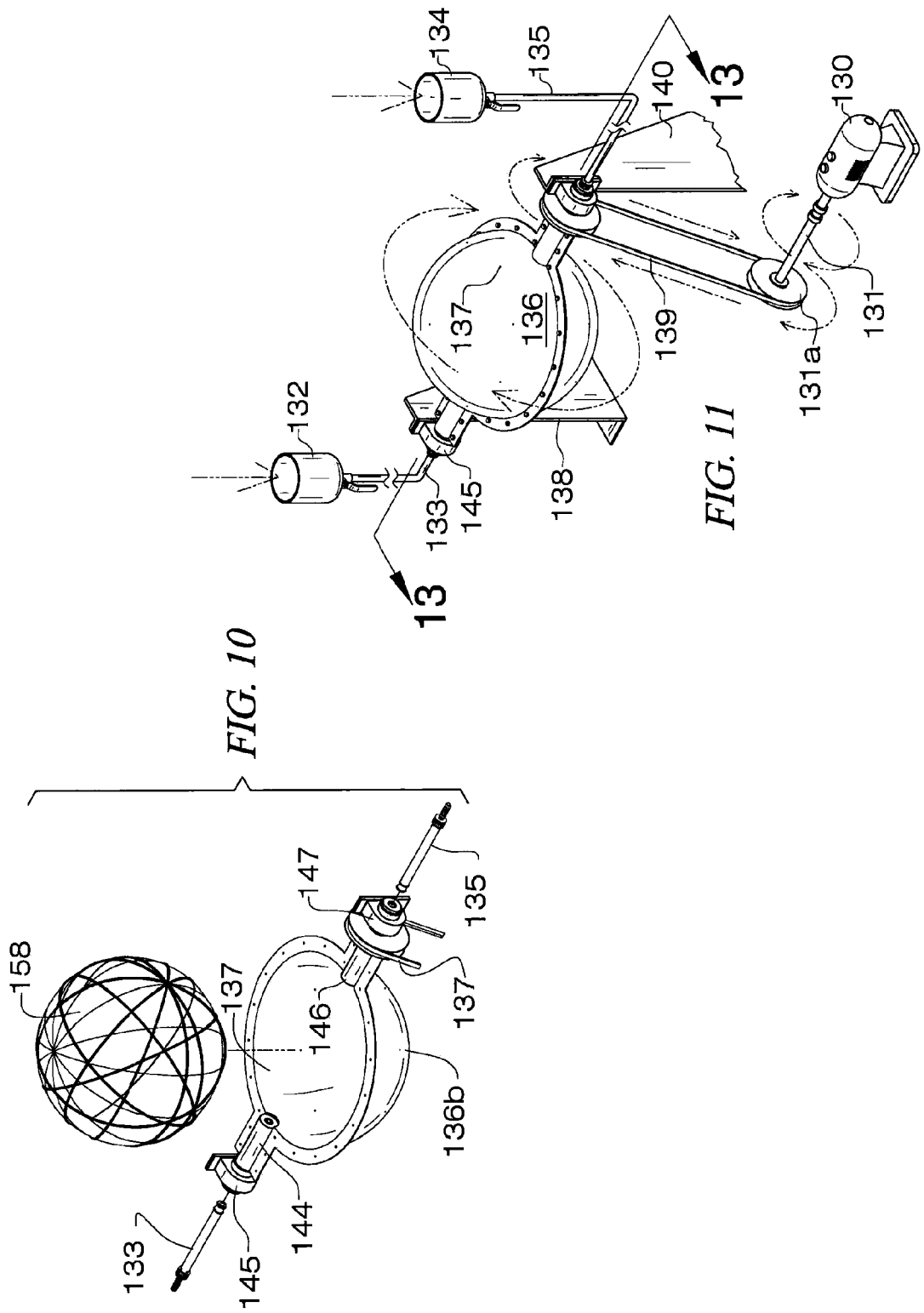

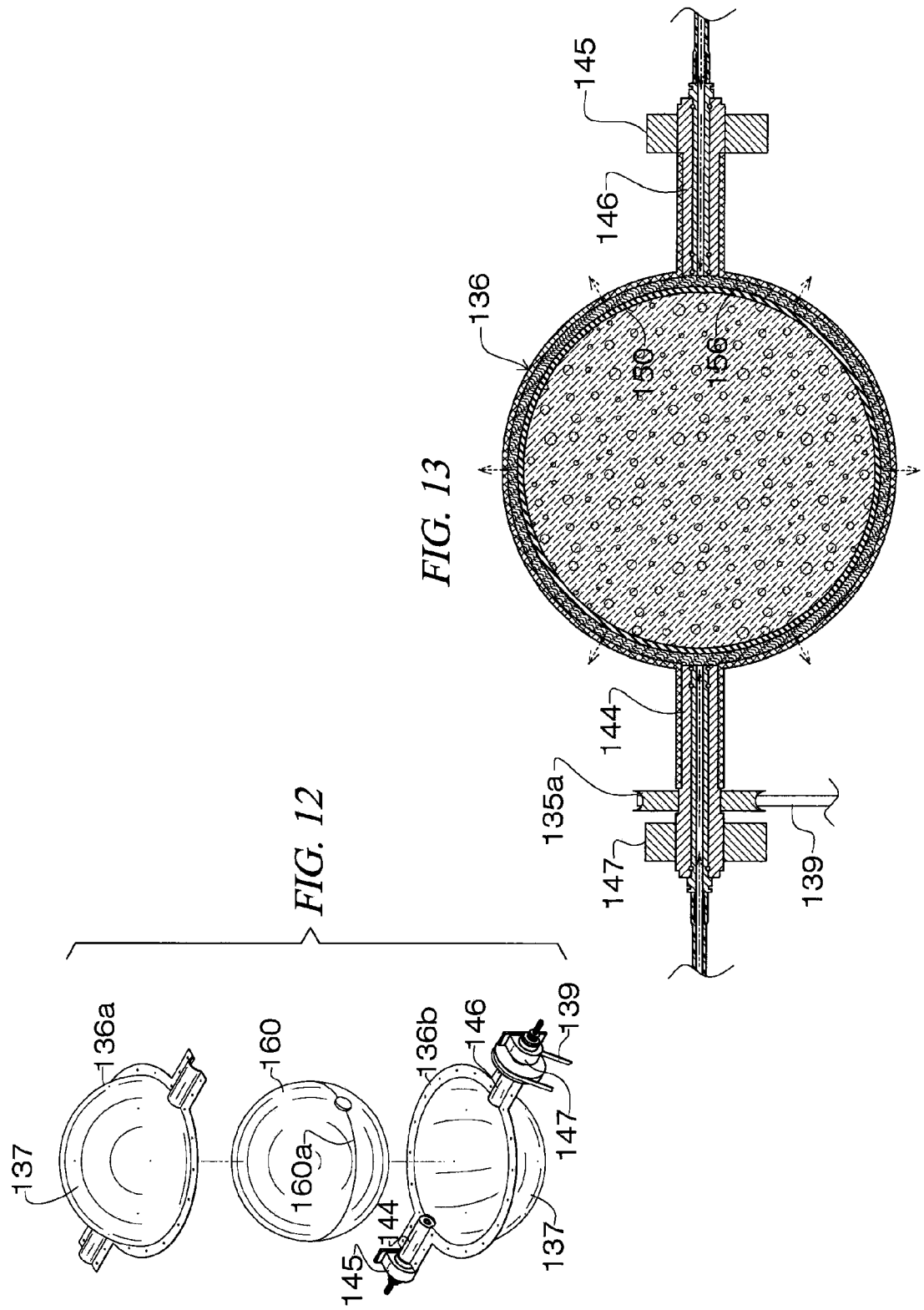

LOW PRESSURE VACUUM RESIN INFUSION SYSTEM

CROSS-REFERENCE TO RELATED APPLICATIONS

This disclosure is a continuation-in-part and claims priority of U.S. patent application Ser. No. 11/967,340 filed by the same inventor on Dec. 31, 2007, now U.S. Pat. No. 7,722,348, entitled "Vacuum Assisted Molding." That disclosure is incorporated in its entirety into this application by reference.

BACKGROUND OF THE INVENTION

1. Field of the Invention

This invention relates to vacuum assisted molding. More particularly, it relates to fabrication of hollow, seamless composite elements of any size using a low pressure vacuum infusion system supplemented by multiple cooperative centrifugal forces.

2. Description of the Prior Art

The manufacturing of large molded objects, such as boat hulls, large blades for an electricity-generating wind turbine, and the like, is problematic. Such large objects are typically molded by a time-consuming manual process. This drives up the cost of the individual products. Items made by manual labor are also more likely to be of inconsistent quality as no two products will be exactly alike.

Injection molding systems for large objects require pressures, typically, of about three thousand pounds per square inch (3,000 lbs/in$^2$). This requires very large and strong holding devices to hold the mold halves closed. Moreover, a seam is formed where the mold halves meet. A part made in such conventional fashion may fail at the seams. For example, large blades rotated by wind for electricity generation often fail by coming apart at the seams. Such catastrophic failures can fling large heavy parts across long distances, causing damage to people, animals, and property.

What is needed, then, is a new, low pressure manufacturing process for making molded but seamless monolithic products of any size and shape. More particularly, there is a need for a manufacturing process that reduces the amount of manual labor needed to produce such objects and that reduces the pressures down to about fifteen pounds per square inch (15 lbs/in$^2$) thereby eliminating the large holding devices of injection molded systems. The needed process would substantially reduce the cost of such molded objects. There is also a need for a new process that produces both large and small molded products having consistently high quality.

However, in view of the art considered as a whole at the time the present invention was made, it was not obvious to those of ordinary skill in this art how the identified needs could be met.

SUMMARY OF INVENTION

The long-standing but heretofore unfulfilled need for an improved manufacturing process for making seamless, hollow molded objects of any size and shape is now met by a new, useful, and nonobvious invention.

The novel mold assembly includes a vacuum chamber having a top piece that serves as a lid or closure means and a bottom piece or main body. The closure means and main body together form a stationary, non-rotating vacuum chamber when said top and bottom pieces are positioned in confronting relation to one another. The main body sits atop a support surface such as a floor and is defined by walls that may collectively form a box-like enclosure or a circular enclosure, depending upon what item is to be made. The top piece is removably mounted atop an upper rim of the walls and is sealingly engaged thereto when air is pumped out of the vacuum chamber.

The vacuum chamber is an atmospheric cofferdam. Just as a conventional cofferdam holds back water so that a dam can be built on dry land, the novel atmospheric cofferdam holds back air so that a part can be molded in a vacuum.

In a first embodiment, a rotatably mounted support table is positioned within the hollow interior of the vacuum chamber and the table rotates about a vertical axis in a horizontal plane.

In a second embodiment, the large vacuum chamber is eliminated and each mold part is individually housed in a vacuum chamber mounted on the rotatable support table.

A third embodiment is like the second embodiment but the support table rotates about a horizontal axis in a vertical plane.

In a fourth embodiment, a spherical mold is rotated about its own axis and no support table is required.

In all four embodiments, the molding process can take place in a vacuum or in the absence of a vacuum. The presence of a vacuum enhances the process but the invention includes structure and method steps that are novel even in the absence of a vacuum.

In the first embodiment, a mold for making a preselected monolithic part is mounted atop the rotatably mounted support table for rotation within the vacuum chamber. The mold includes at least one small opening formed therein so that the interior of the mold is open to the vacuum of the vacuum chamber. As will become increasingly clear as this disclosure proceeds, the vacuum in the atmospheric cofferdam draws resin towards the surface of the mold so that the fiber architecture within the mold is thoroughly impregnated with resin. Centrifugal forces generated by rotation of the mold within the atmospheric cofferdam further enhances the thoroughness and the speed of fiber architecture resin impregnation but the invention does not require such rotation.

The first embodiment includes a plurality of hollow part molds disposed in circumferentially spaced relation to one another about the support table and in radial relation to the vertical axis of rotation of the support table. Each of the hollow part molds includes a top piece and a bottom piece adapted to be releasably secured to one another. The top and bottom pieces abut one another along a parting line when placed into confronting relation to one another. However, unlike conventional molds, no seam is formed at the parting line.

A resin reservoir is positioned externally of the vacuum chamber and is adapted to deliver resin or other moldable material to the hollow interior of each part mold.

A support table motor mounted outside of the stationary vacuum chamber is adapted to rotate the support table within the stationary vacuum chamber. The support table motor rotates the upstanding shaft and hence the flat platform and the part molds.

In the first three embodiments, each part mold has an elongate structure and a longitudinal axis. Each part mold is rotated about its longitudinal axis in addition to the rotation in a horizontal plane (first two embodiments) or vertical plane (third embodiment).

More particularly, a part mold motor is connected to each part mold to rotate each part mold about its longitudinal axis as said part mold also rotates with the support table. Each part mold motor has an output shaft and a gear is secured to the output shaft for conjoint rotation therewith. A centrally apertured gear receives, encircles and is secured to each part mold so that rotation of the centrally apertured gear effects simultaneous and corresponding rotation of the part mold. The centrally apertured gear is disposed in meshing engagement with the gear secured to the output shaft of the part mold motor so that operation of the part mold motor effects rotation of the part mold about its longitudinal axis. Each part mold motor and its associated part mold therefore rotate together in a horizontal (first and second embodiments) or vertical plane (third embodiment) in conjoint rotation with the rotating shaft and each part mold simultaneously rotates about its longitudinal axis.

A first centrifugal force created by the rotation of each part mold about a vertical or horizontal axis thus drives resin in a generally horizontal or vertical direction, respectively, to the radially outermost end of each part mold and a second centrifugal force created by the rotation of each part mold about its longitudinal axis drives resin to flow radially outwardly from said longitudinal axis in a generally horizontal or vertical plane to the interior walls of each part mold.

In the first embodiment, a plurality of wheels is secured to the underside of the rotatable support table and the wheels ride upon a radially-inwardly extending support shelf that is formed integrally with the annular wall of the main body of the vacuum chamber. An aperture is formed centrally of the support table to accommodate the upstanding rotating shaft in the horizontal support table embodiment. The aperture accommodates the horizontal rotating shaft in the vertical support table embodiment.

Any moldable material such as a ceramic composite material may be used instead of resin. In all embodiments, the resin saturates a resin architecture that is selected depending upon the application.

In all four embodiments, an inflatable bladder is positioned within each part mold and fiber architecture is positioned externally of each bladder, i.e., between the bladder and the interior walls of the part mold. Resin or other moldable material is introduced into the fiber architecture after a vacuum has been created in the atmospheric cofferdam and the support table (first three embodiments) rotates about its horizontal or vertical axis and the individual part molds rotate with the support table and about their own longitudinal axes.

At least one small opening in each part mold causes the bladder to expand because said at least one small opening exposes the exterior of the bladder to the vacuum within the atmospheric cofferdam. The expanding bladder exerts a compressive force against the fiber architecture, pressing it firmly against the interior walls of the part mold until the fiber architecture is thoroughly permeated with resin or other moldable material and pressed tightly against the interior walls of the part mold to remove all voids. The rotation of the support table about a horizontal (first and second embodiments) or vertical (third embodiment) axis creates a centrifugal force that urges resin to flow from a radially inner end of each part mold to a radially outer end of each part mold, and the simultaneous rotation of each part mold about its longitudinal axis creates a centrifugal force that urges resin to flow radially outwardly relative to said longitudinal axis.

Resin or other moldable material is not introduced into the hollow interior of each part mold until the air within the vacuum chamber has been substantially pumped out. Although the novel mold can be used without the vacuum chamber, the amount of centrifugal force required to drive resin to the radially outermost ends of the part molds is greatly reduced when the air is removed prior to the double rotation of the mold assembly.

The novel apparatus produces a finished molded product having a monolithic, seamless structure. The finished molded product is removed from the novel apparatus by releasing the vacuum, separating the vacuum chamber top piece from the vacuum chamber bottom piece, followed by separating each part mold top piece from each part mold bottom piece. The collapsed bladder may be removed from the hollow interior of the part and re-used. Unlike conventional molding systems such as the above-mentioned high pressure injection molding systems, no further work must be performed on the part when it is removed from its part mold.

The primary object of this invention is to provide a method for making very large structures by employing a molding process.

Another object is to provide large monolithic structures that lack seams and which therefore cannot come apart along said seams.

Still another object is to provide large structures at greatly reduced cost and consistent quality by eliminating many hours of manual labor per part.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 10 is an exploded perspective view of some of the parts of the fourth embodiment;

FIG. 11 is a perspective view of the parts of the fourth embodiment when not mounted in a vacuum chamber;

FIG. 12 is an exploded perspective view of some of the parts of the fourth embodiment depicting a finished product when the mold parts are separated from one another;

FIG. 13 is a side elevational view depicting a variation of the fourth embodiment where the bladder is pressurized from within;

DETAILED DESCRIPTION OF THE PREFERRED EMBODIMENT

Figure 1:
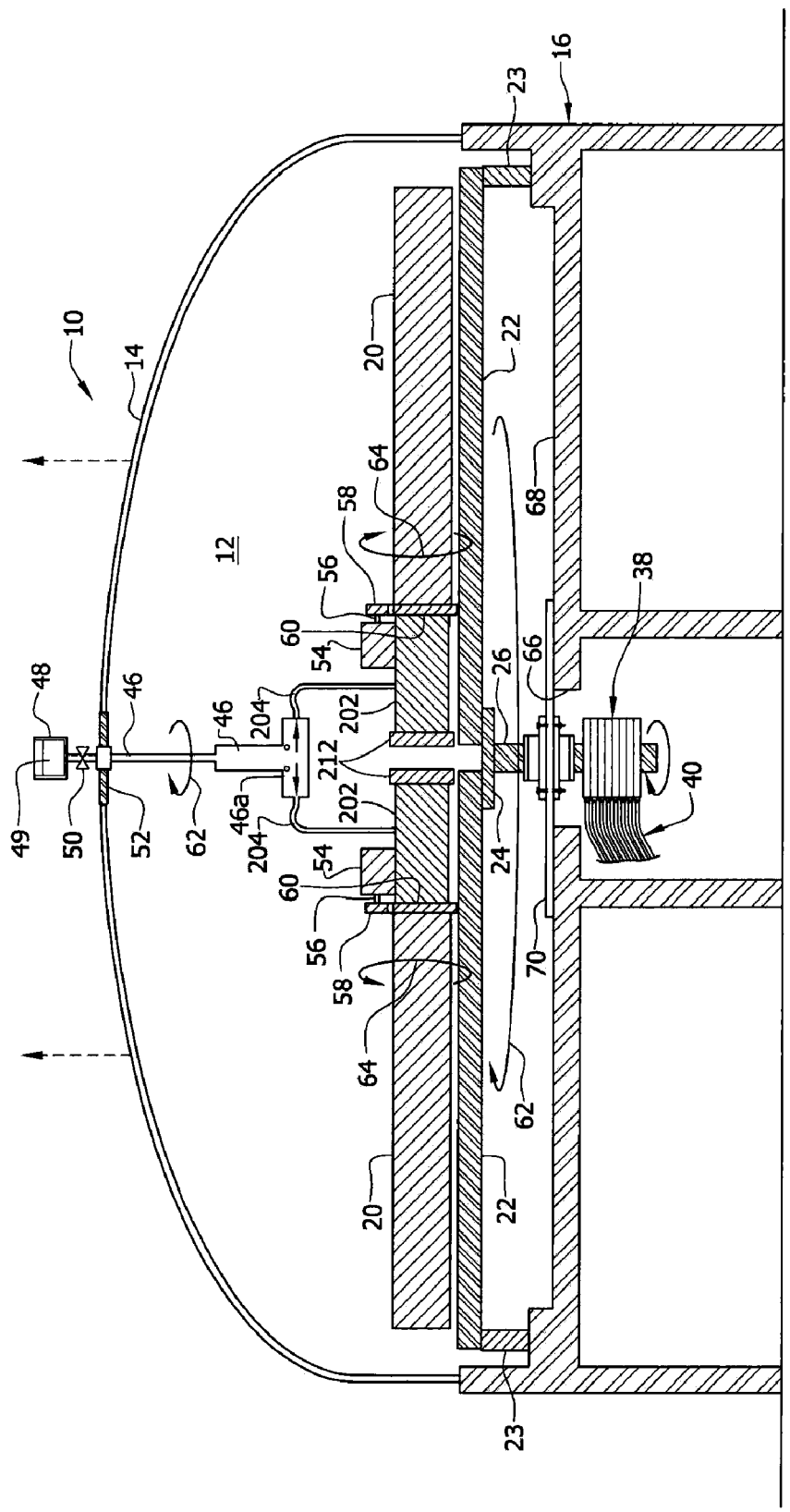
FIG. 1 is a diagrammatic side sectional view of a first embodiment of the novel mold assembly.

Referring now to FIG. 1, it will there be seen that an illustrative embodiment of the invention is denoted as a whole by the reference numeral 10.

Mold assembly 10 includes a stationary, non-rotating vacuum chamber 12 defined by vacuum chamber top piece or closure means 14 and non-rotating vacuum chamber bottom piece or main body 16. Air is pumped from vacuum chamber 12 by any suitable means. The vacuum chamber is an atmospheric cofferdam because it allows the molding process to take place in a near vacuum, just as a conventional cofferdam enables a dam to be built in a water-free environment.

In this first illustrative embodiment, a mold for making a two-blade fan of the type having utility in wind farms, cooling towers, ventilation systems, hydroelectric turbines, counter rotating compressor blades and the like is mounted for rotation within vacuum chamber 12. The blade molds are collectively denoted 20 and are better identified as part molds because they can be configured to produce not just blades but any hollow object including aircraft fuselages, natural gas tanks, gas tanks for motorcycles or other vehicles, bus bodies, high pressure tanks, car bodies, and the like. The number of part molds 20 is not critical, nor is the shape and size thereof. Significantly, unlike conventional molded parts, the parts made by the novel method are seamless. An aircraft fuselage made with the novel structure will be integrally formed and thus have greater structural integrity than a fuselage that is made in parts and then joined together with rivets, welds, and the like.

At least one micro perforation 137 (FIG. 2) is formed in each part mold 20 so that the vacuum in vacuum chamber 12 is communicated to the interior of each part mold.

Rotating support table 22 is centrally supported by flat platform 24 that surmounts upstanding drive shaft 26 and rotates conjointly therewith.

Rotating support table 22 is supported at its radially outermost periphery by idler wheels 23 and said wheels are supported by an annular support shelf that extends radially inwardly from vacuum chamber main body 16 as depicted.

Figure 2:
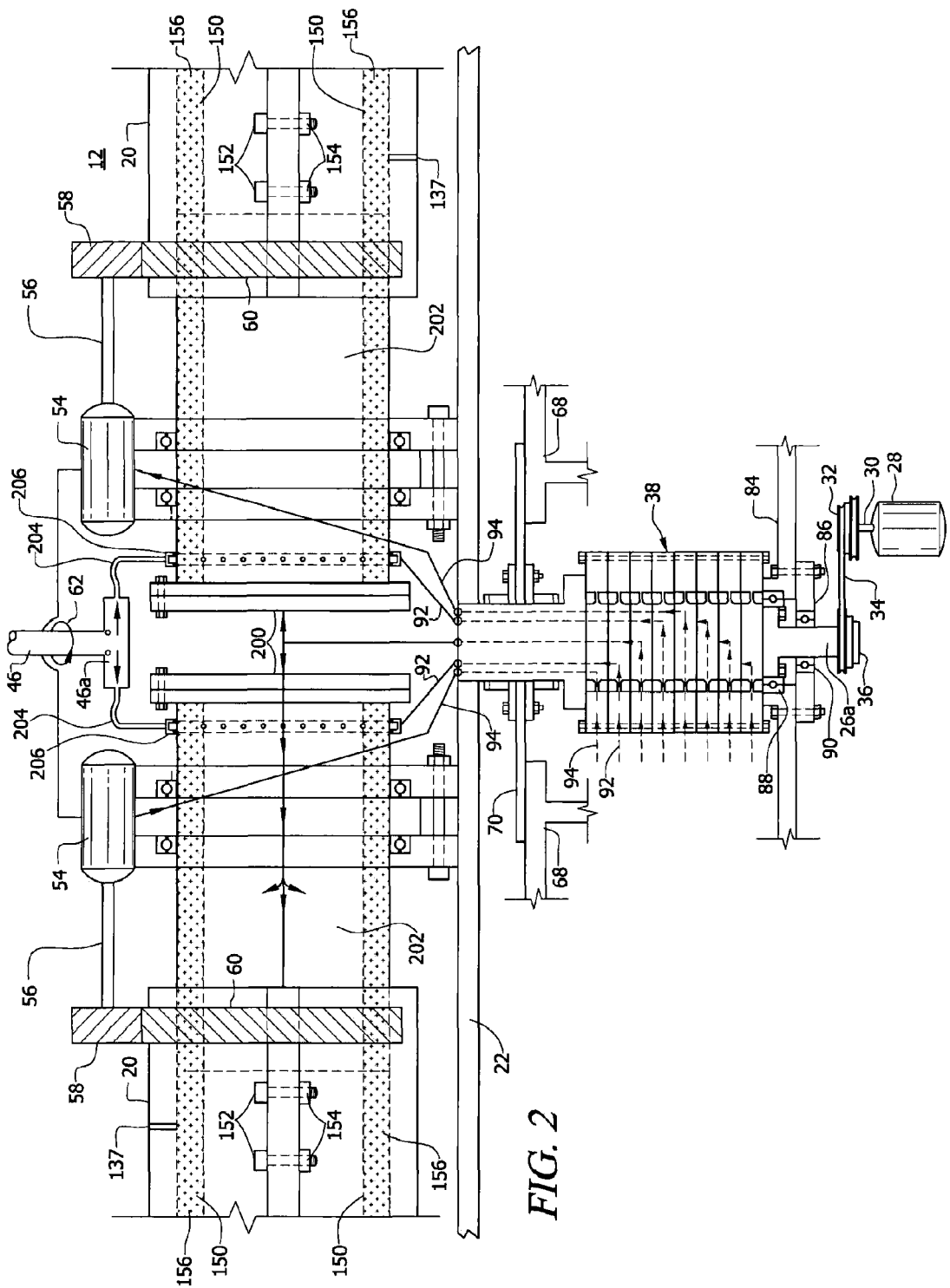
FIG. 2 is a less diagrammatic, more detailed view of the first embodiment.

Rotation of drive shaft 26 and hence rotation of table 22 at variable speeds is caused by motor 28, depicted in the more detailed view of FIG. 2, having power take off shaft 30 that is connected to a reduced diameter end 26a of drive shaft 26 by variable speed pulleys 32 and 36 that are joined to one another in multiple combinations by belt 34.

A plurality of couplers and shaft seals, collectively denoted 38, is centrally apertured to receive drive shaft 26 and is slideably and sealingly but not fixedly connected thereto. Said couplers and shaft seals 38 do not rotate because they are in fluid communication with a plurality of air and hydraulic hoses, collectively denoted 40 in FIG. 1, that are not mounted for rotation. Said air and hydraulic hoses are connected at their respective, unillustrated proximal ends to suitable stationary sources of compressed air and hydraulic fluid, respectively. The use of hoses 40 is not depicted. Prepreg and thermal set resin as well as ceramic and ceramic composite materials may be used. Hoses 40 are used when thermal set resins and prepeg are used. Hoses 40 are also used when large structures are bladder blow molded using the novel apparatus.

An opening is formed in the center of vacuum chamber top piece 14 to accommodate resin tube 46. Resin reservoir 48, adapted to contain resin 49, surmounts resin tube 46 and the flow rate of resin from said reservoir is controlled by metering or pumping, or both, un-catalyzed or catalyzed resin, or both, to a mixing injector head 46a. The flow of resin into said resin tube is under the control of manually, hydraulically, electrically, or pneumatically-operated valve 50 (FIG. 1). A sheet of centrally-apertured Plexiglas® 52 is secured to top piece 14 to reinforce said top piece at the point of entry of said resin tube. It also enables an operator to look into the mold.

Centrifugal forces acting on the resin cause the resin to migrate radially outwardly, relative to the axis of spin of support table 22, along the entire extent of each part, cavity, or toroidal galleries in each part mold 20. The resistance to such outward flow is nominal in view of the vacuum created prior to introduction of resin. In this way, resin is carried all the way to the radially outermost end of each part mold 20.

Ideally, the resin should accumulate on and conform to the shape of the interior wall of each monolithic fiberglass part mold 20. However, to ensure that no voids are present in the finished product, means are provided to rotate each monolithic fiberglass part mold 20 about its longitudinal or vertical axis at the same time that each part mold is rotating in a horizontal or vertical plane about the vertical or horizontal axis of vacuum chamber or atmospheric cofferdam 10.

More particularly, each part mold 20 is rotated about its longitudinal or vertical axis of symmetry by a hydraulic motor 54 associated with each part mold. Each hydraulic motor has an output shaft 56 and a gear 58 secured thereto for conjoint rotation therewith. A centrally apertured gear 60 receives, encircles and is secured to each part mold 20 for conjoint rotation therewith. It meshingly engages gear 58 so that operation of hydraulic motor 54 effects rotation of its associated part mold 20 about its longitudinal or radial axis of symmetry. Each hydraulic motor 54 is mounted to its associated part mold 20 so that said part mold 20 and hydraulic motor 54 rotate together in a horizontal or vertical plane in conjoint rotation with drive shaft 26. The rotation of the molds in an illustrative horizontal plane is denoted by directional arrow 62 and the rotation of the part molds about their individual longitudinal axes of symmetry is denoted by directional arrows 64.

Opening 66 is formed centrally of table support surface 68 to accommodate drive shaft 26 and related parts. Flat plate 70 closes opening 66 and said flat plate 70 is also centrally apertured to accommodate drive shaft 26.

As depicted in FIG. 2, a primary stationary frame 84 is centrally apertured to accommodate an unreduced-in-diameter extent of drive shaft 26. A secondary stationary frame 86 is bolted in underlying relation to primary stationary frame 84 and is centrally apertured to accommodate the reduced diameter extent 26a of the drive shaft. First flange bearing 88 engages drive shaft 26 at the central aperture formed in the primary stationary frame and second flange bearing 90 engages drive shaft 26 at the central aperture formed in secondary stationary frame 86.

Non-rotating couplers and shaft seals 38 include both hydraulic and pneumatic couplers. Bores or passageways, called galleries in the industry, for delivering resin, catalyst, solvent, compressed air, hydraulic fluid under pressure, and other fluids for heating or cooling, or both, inflating bladders, deflating bladders, filling bladders with fluids, pressurizing bladders with fluids or gases, flushing injection nozzles with solvent, and other functions, are formed in rotating drive shaft 26 and the non-rotating couplers and shaft seals provide the interface between stationary sources of such materials and said rotating drive shaft.

More particularly, the resin inlets are collectively denoted 92 and the hydraulic fluid inlets are collectively denoted 94. The resin passageways are in fluid communication with connectors that are disposed radially outwardly of the compressed air connector. Hydraulic fluid passageways 94 are in fluid communication with connectors that are disposed radially outwardly of the resin connectors.

The bladder is denoted 150 in FIG. 2 and the fiber architecture is denoted 156. A bladder holding assembly 202 engages the radially inward end of each bladder 150 and holds it against radially outward displacement as it is subjected to centrifugal forces. Such an assembly may take many forms; the preferred form is disclosed at the conclusion of this disclosure in connection with FIG. 15 due to the large number of possible structures that could hold the bladder in an acceptable manner.

Figure 3A:
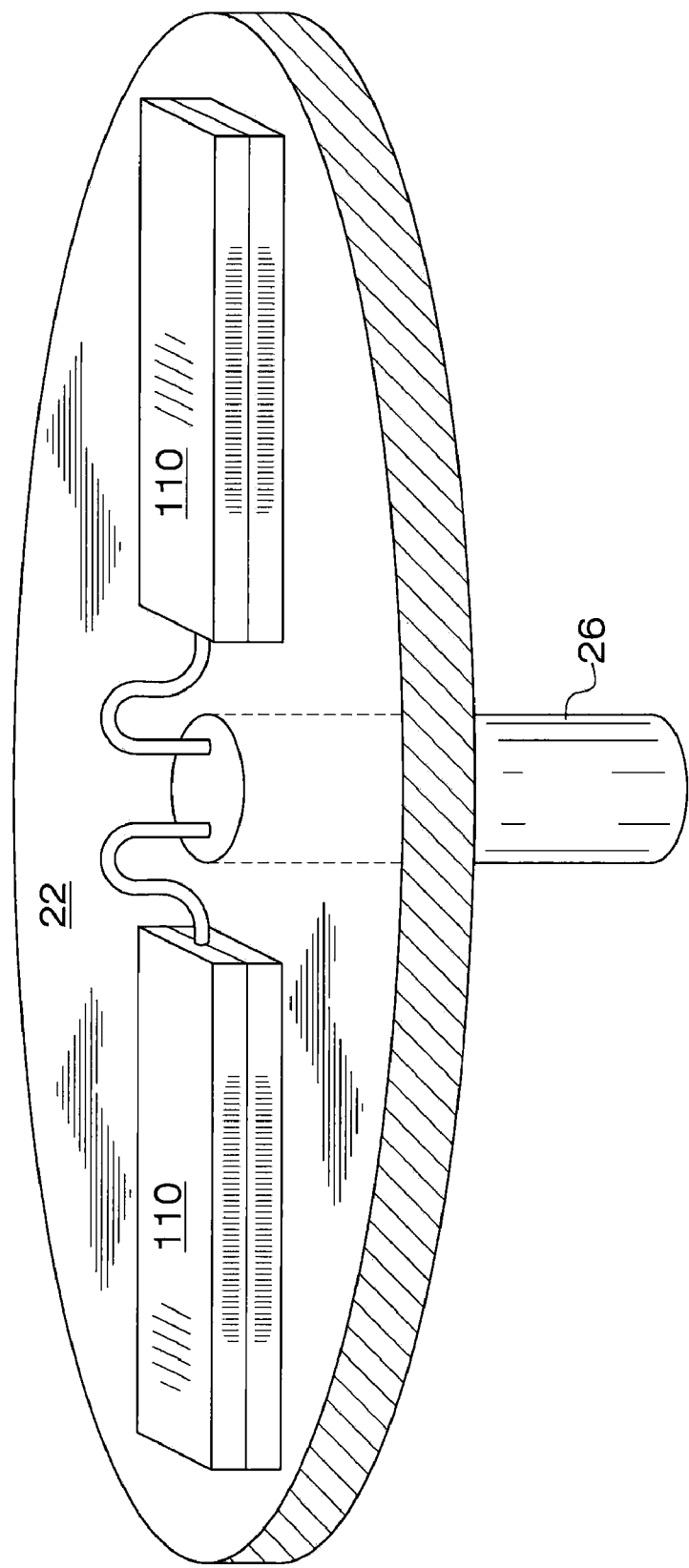
FIG. 3A is a perspective view of the second embodiment having a horizontal support table embodiment that eliminates the large vacuum housing.
Figure 3B:
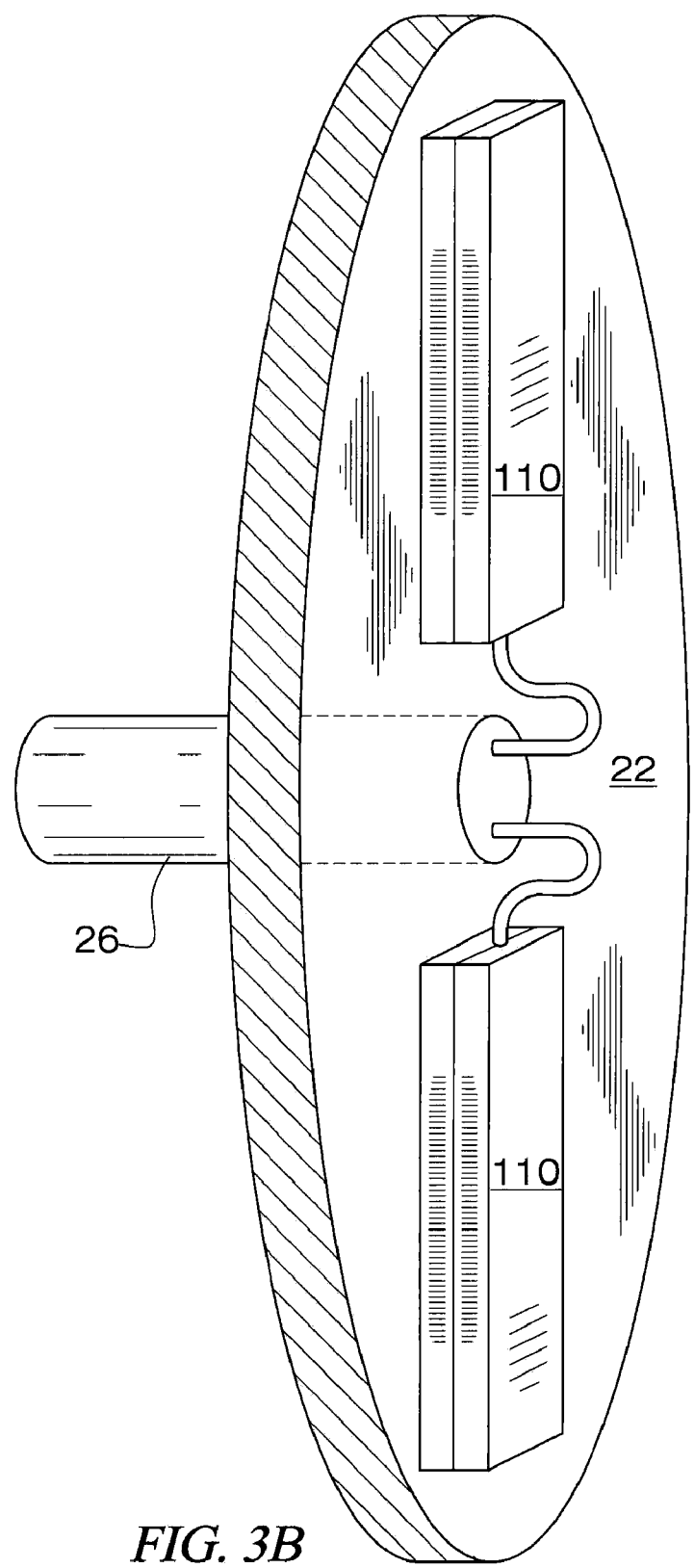
FIG. 3B is a perspective view of the third embodiment having a vertical support table that also eliminates the large vacuum housing.
Figure 4:
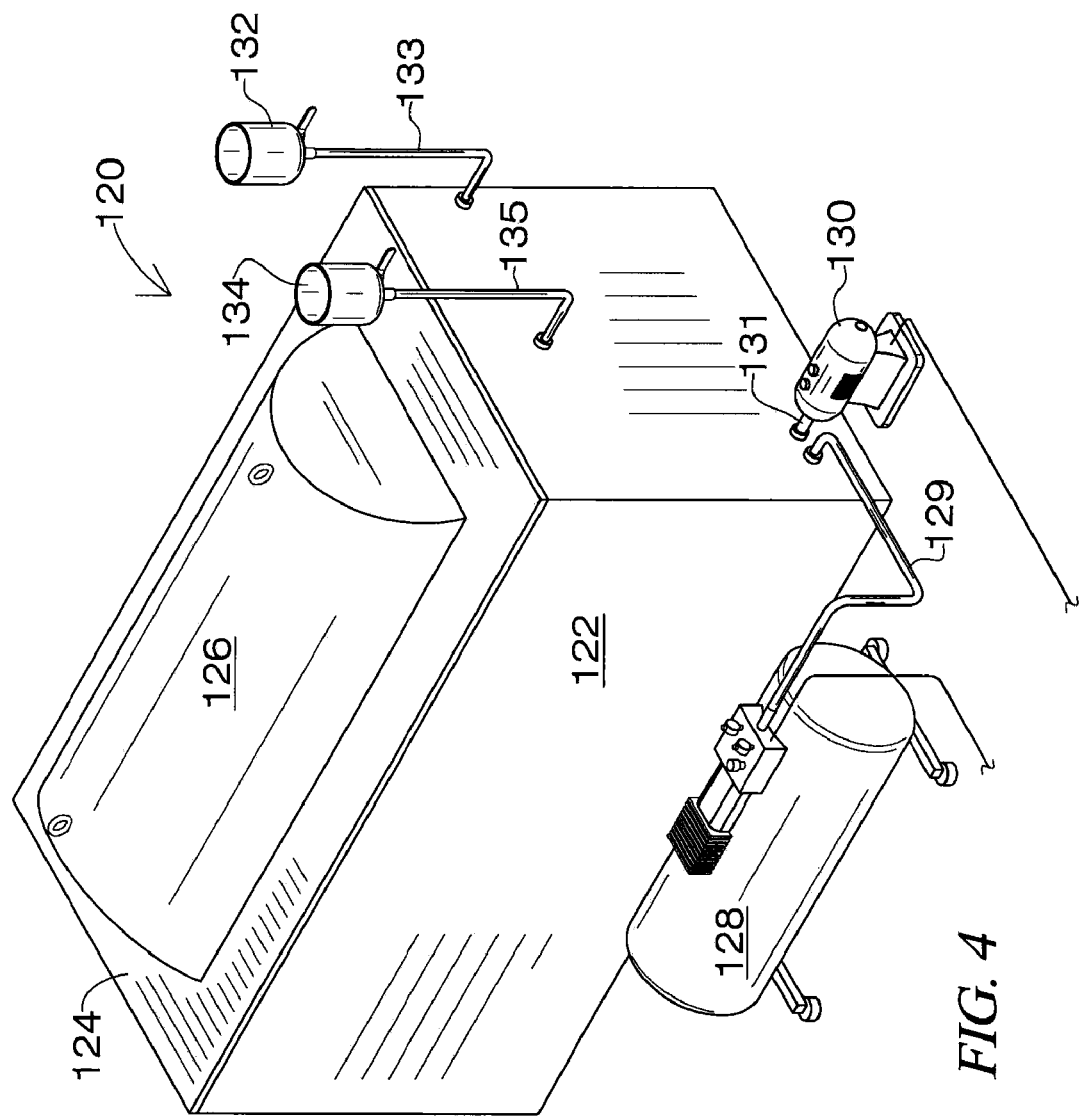
FIG. 4 is a perspective view of a fourth embodiment including a mold for making a hollow spherical object.

A second embodiment is depicted in FIG. 3A and a third embodiment is depicted in FIG. 3B.

Although it is advantageous to position each part mold 20 within a vacuum, it is not necessary to enclose the entire apparatus in a monolithic vacuum chamber or atmospheric cofferdam 12 as in the first embodiment.

In the second embodiment of FIG. 3A, large vacuum chamber 12 is eliminated. Instead, each part mold 20 having micro perforations 137 formed therein is individually enclosed within a vacuum housing or atmospheric cofferdam 110 dedicated to it. Far less energy is needed to create a vacuum in such smaller housings 110 vis a vis the larger vacuum chamber 12. Moreover, the smaller housings 110 are safer to use than the larger housing 12 because a worker might be in the larger housing when another unaware worker closes the vacuum chamber and begins operating the apparatus. Only two housings 110 are depicted in FIG. 3A to simplify the drawing but it should be understood that more of such housings may be symmetrically arranged on the supporting surface.

FIG. 3B depicts a third embodiment like that of the second embodiment but where support table 22 is oriented in a vertical plane for rotation about a horizontal axis.

A fourth embodiment including a vacuum chamber or atmospheric cofferdam 120 for making hollow spherical objects is depicted in FIGS. 4-13. This structure is easily adaptable to making hollow non-spherical seamless objects such as aircraft fuselages, natural gas tanks, bus bodies, high pressure tanks, car bodies, wind generator blades, and the like as well.

Atmospheric cofferdam 120 includes a box-like main body 122 having lid or closure means 124. In this particular embodiment, an elongate convexity 126 is formed in lid 124 to accommodate a spherical object. The convexity reduces the amount of air that must be pumped from atmospheric cofferdam 120 relative to the amount of air that would need to be removed if main body 122 were deep enough to accommodate a spherical object without said convexity formed in lid 124.

Vacuum pump 128 is in fluid communication with the interior of vacuum chamber 120 through conduit 129. Motor 130 has power take off shaft 131 that extends into the hollow interior of vacuum chamber 120. Reservoir 132 is a resin feed reservoir in fluid communication with conduit 133 and reservoir 134 is a resin feed reservoir in fluid communication with conduit 135.

Figure 5:
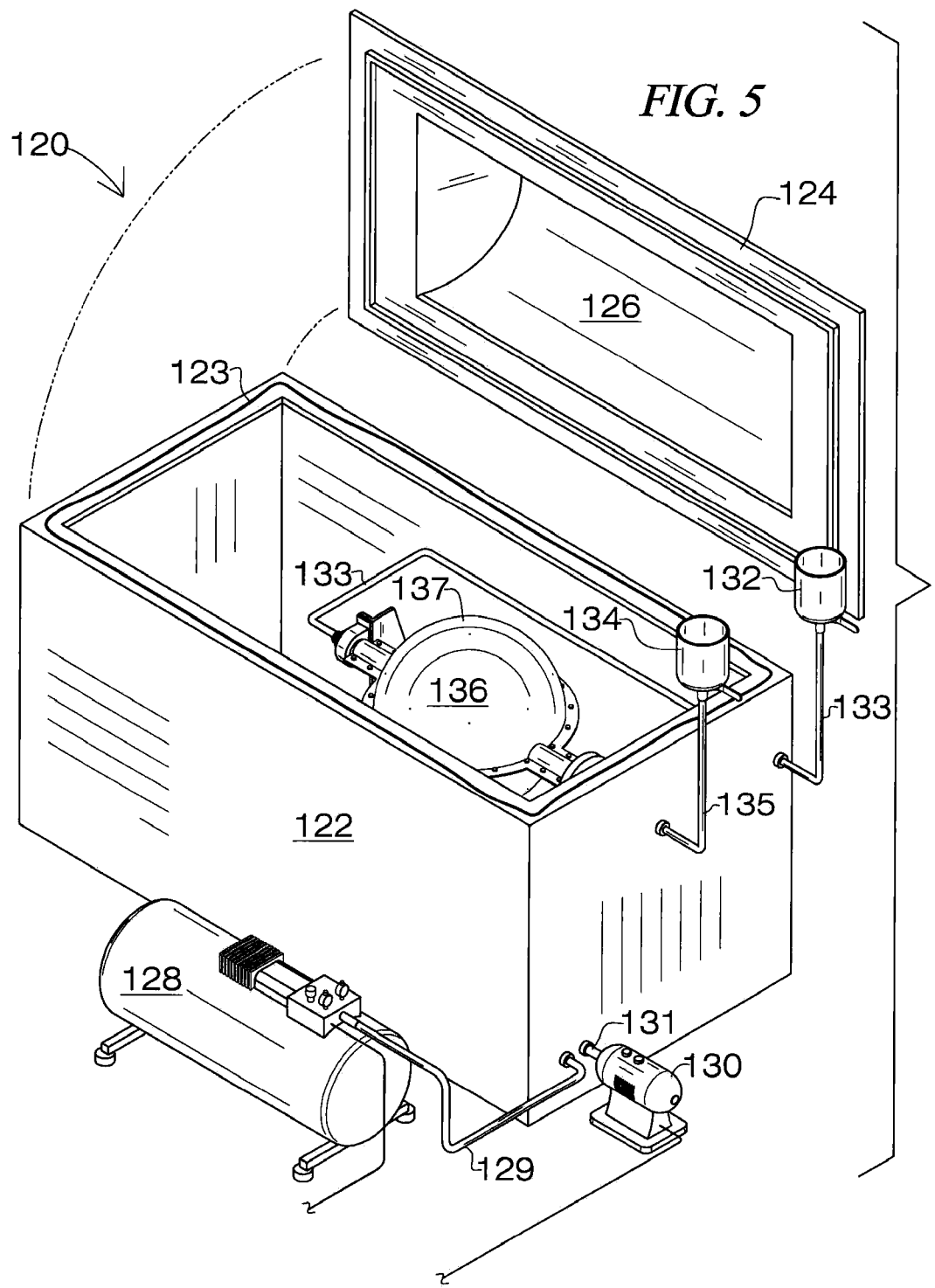
FIG. 5 is a perspective view like that of FIG. 4 but showing the vacuum chamber lid in its open configuration.

The same parts are depicted in the exploded view of FIG. 5. A mastic 123 is squeezed from a tube and applied about the rim of main body 122 as depicted to enhance the seal when the vacuum chamber is ready for use. Said mastic may also be applied where lid 14 meets main body 16 in the embodiment of FIG. 1 and along the parting lines of housings 110 in the second and third embodiments.

Mold 136 in this particular embodiment may be shaped as needed to make virtually any part, but to simplify the drawings and to reduce the length of the disclosure, mold 136 is a sphere for making a hollow spherical object.

A plurality of micro perforations is formed in mold part 136. One of them is denoted 137 and the others are not numbered because the lead line essentially obscures them. The vacuum in chamber 120 is communicated to the interior of mold part 136 through said micro perforations but said micro perforations are too small for resin to leak through.

Figure 6A:
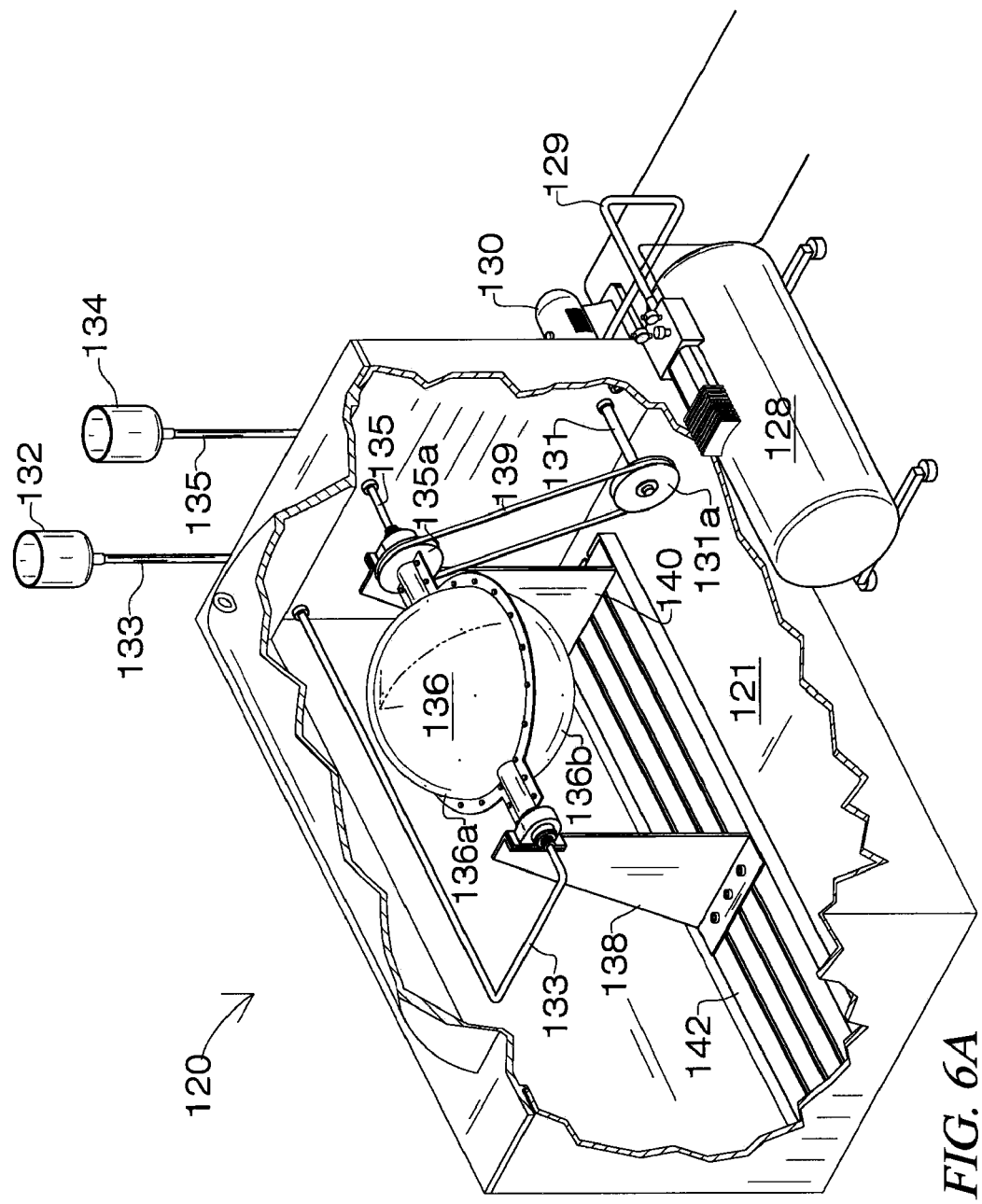
FIG. 6A is a cut-away perspective view of the fourth embodiment.
Figure 6B:
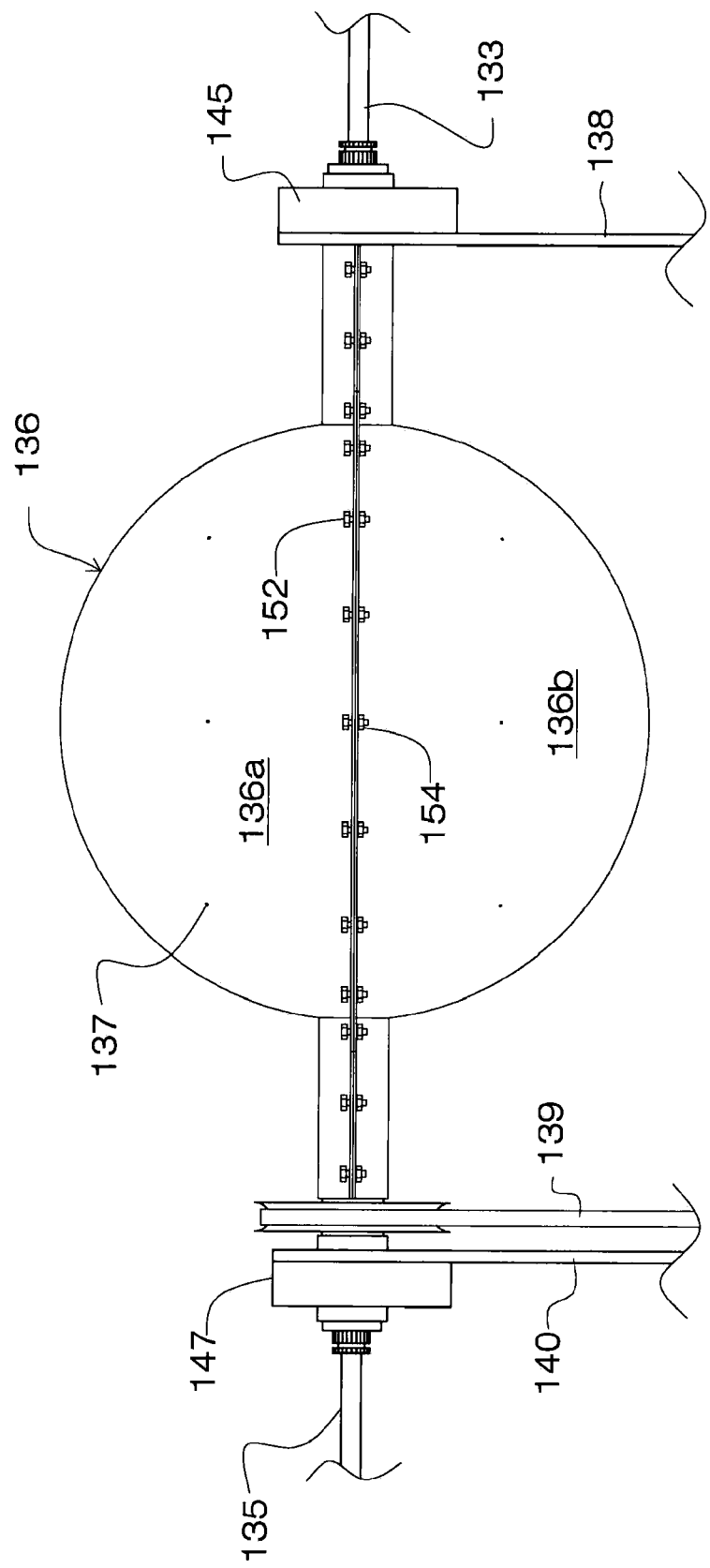
FIG. 6B is a side elevational view of the fourth embodiment.

Mold 136 and its associated parts are better depicted in FIGS. 6A and 6B. Mold 136 is formed by placing hemispherical mold parts 136a and 136b in abutting relation to one another as depicted. As depicted, each hemispherical mold part includes an annular flange and multiple bolts 152 and nuts 154 (FIG. 6B) are employed to secure the two hemispherical parts to one another.

Spherical mold 136 is supported by upstanding support legs 138 and 140 and said support legs are in turn adjustably mounted along the length of support frame 142 that is secured to bottom wall 121 of vacuum chamber 120.

FIG. 6A also depicts pulley 131a that is secured to a free end of power take off shaft 131 for conjoint rotation therewith and pulley 135a. Pulleys 131a and 135a are interconnected by drive belt 139.

Figure 7:
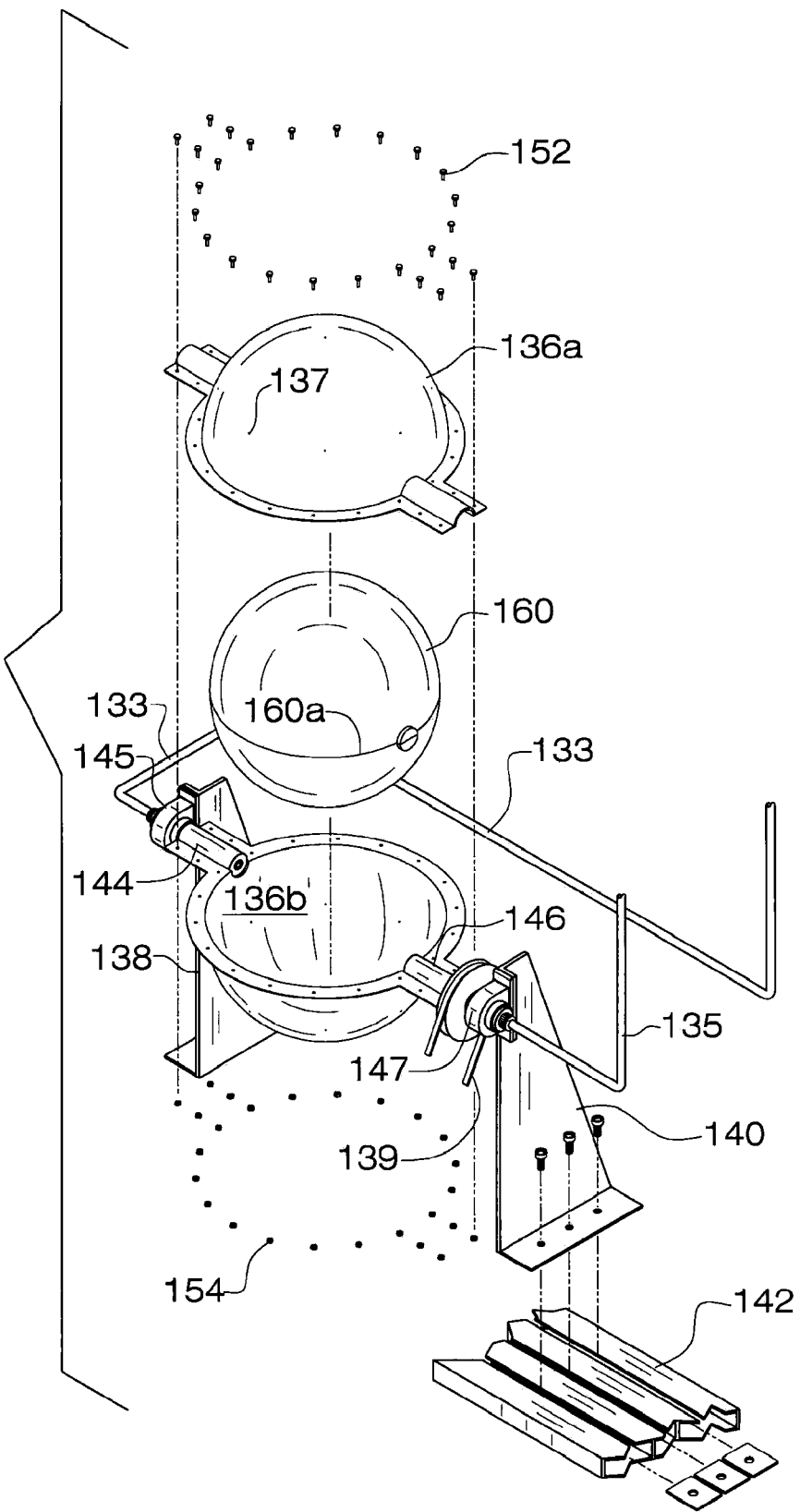
FIG. 7 is an exploded perspective view of the fourth embodiment.

As best understood in connection with FIG. 7, first axle 144 is hollow and is journaled to an upper end of leg support 138 in pillow block 145. Second axle 146 is also hollow and is journaled to an upper end of leg support 140 in pillow block 147.

Figure 14:
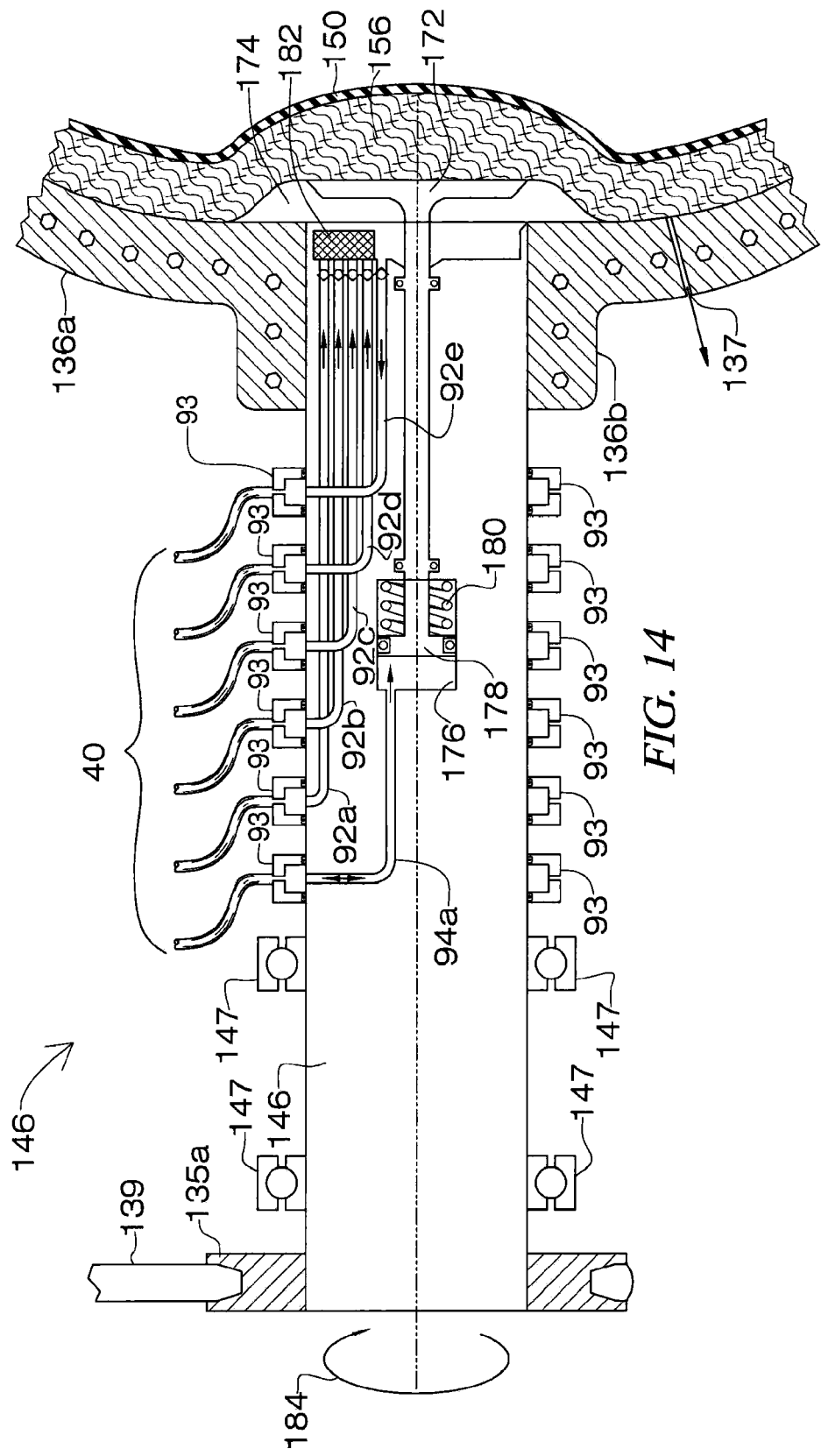
FIG. 14 is a diagrammatic view of a nozzle apparatus for rotating, mixing and flushing an injection port.

Said axles 144 and 146 are also nozzle assemblies that deliver resin to the fiber architecture 156 that is positioned in sandwiched relation between bladder 150 and the interior surfaces of mold parts 136a, 136b, as more fully disclosed in connection with FIG. 14.

As depicted in FIG. 7, spherical bladder 150 is positioned in sandwiched relation between mold parts 136a and 136b. The diameter of spherical bladder 150 is less than the interior diameter of mold parts 136a and 136b when they are secured to one another by an amount sufficient to accommodate fiber architecture 156 as will become increasingly clear as this disclosure continues. Mold parts 136a and 136b are secured to one another by a plurality of bolts collectively denoted 152 and a plurality of nuts collectively denoted 154. A mastic, not depicted in FIG. 7, is preferably applied between the abutting flanges to enhance the seal.

Figure 9:
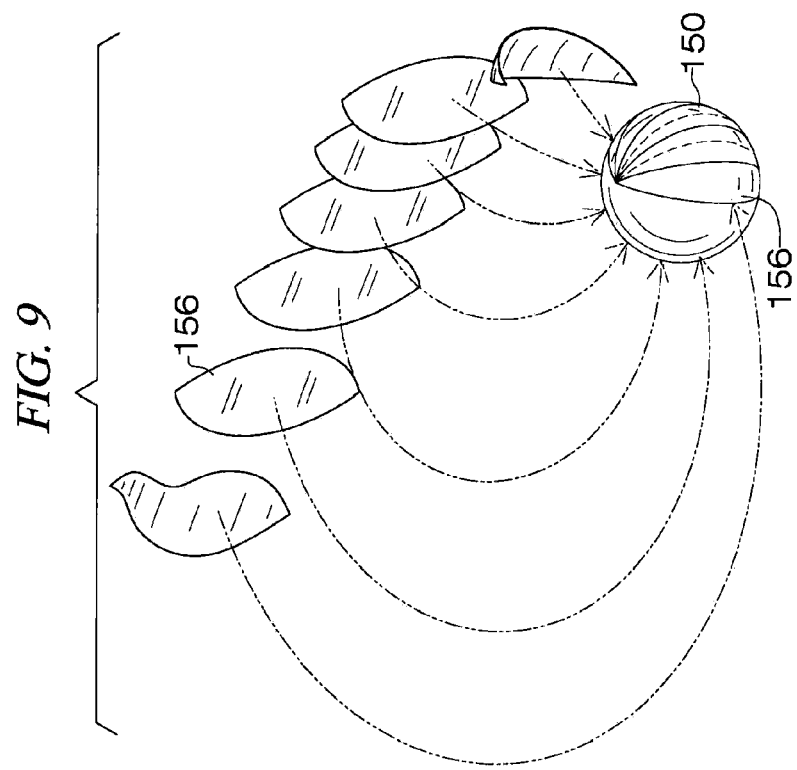
FIG. 9 is an exploded perspective view depicting how the pieces of fiber architecture depicted in FIG. 8 are applied to the bladder in overlapping relation to one another.
Figure 8:
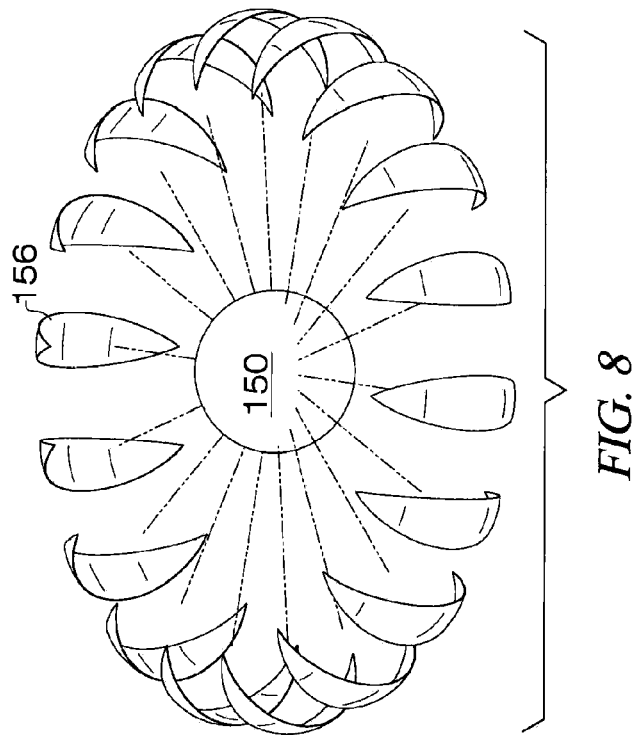
FIG. 8 is an exploded perspective view depicting how a bladder is covered with individual pieces of fiber architecture in the fourth embodiment.

Bladder 150 is covered with multiple crescent-shaped strips 156 of fiber architecture as indicated generally in FIG. 8. Strips 156 are applied to bladder 150 in overlapping relation to one another as depicted in FIG. 9. Note the dotted lines in FIG. 9, indicating an edge of a strip covered by another strip. This over lapping of strips 156 enables bladder 150 to remain fully covered when bladder 150 expands radially outwardly under the influence of the vacuum.

Strips 156 are not restricted to crescent shapes. They would be shaped differently for non-spherical bladders.

As depicted in FIG. 10, fibrous twine 158 is wrapped around fiber architecture strips 156 to hold said strips to bladder 150 prior to initiation of the molding process.

As best understood in connection with FIG. 11, rubber bladder 150 having overlapping fiber architecture strips 156 applied thereto and held in position by fibrous twine 158 is housed between mold parts 136a, 136b and said parts are secured to one another by said bolts 152 and nuts 154 as aforesaid. Vacuum chamber 120 is evacuated and motor 130 is switched on to rotate mold 136. Resin is introduced through reservoirs 132, 134 via conduits 133, 135, respectively, to diametrically opposed poles of spherical mold 136. Although the figures depict a gravity feed for the resin, pistons or other active means could be used to meter the resin into each reservoir in precisely measured amounts. The resin seeps into the fiber architecture and is spread throughout by the combined effects of the vacuum and the spinning of mold 136.

When a vacuum chamber is employed, micro perforations 137 communicate the vacuum to the interior of mold 136. The vacuum affects bladder 150 because fiber architecture strips 156 are porous. Bladder 150 therefore expands and compresses fiber architecture strips 156, causing the resin to be distributed evenly throughout said strips. The amount of vacuum is selected so that it causes bladder 150 to compress said fiber architecture, but not so tightly as to impede flow of resin through said fiber architecture.

As suggested by FIG. 11, this novel method may also be performed in the absence of vacuum chamber 120, in which case micro perforations 137 would perform no function.

The novel method may also be performed without spinning mold 136. The vacuum would then be relied upon to cause the resin to thoroughly saturate the fiber architecture.

It is also feasible to eliminate vacuum chamber 120 and to deliver a vacuum to each micro perforation by means of hoses. A single vacuum pump could be in fluid communication with each of the micro perforations. More particularly, a plurality of hoses would provide fluid communication between each micro perforation and the vacuum pump so that a vacuum would be communicated to each micro perforation in the absence of an atmospheric cofferdam. This would require either a stationary vacuum pump and stationary hoses that slidingly seal against the micro perforations as mold 136 rotates, or the pump and hoses would have to rotate conjointly with the mold.

FIG. 12 depicts the final product of this particular embodiment. It is a rigid, spherical ball-like member 160 having parting line 160a but having no seams of the type created by conventional injection molding.

FIG. 13 provides a cross-sectional view of the novel apparatus but it also depicts a variation of the fourth embodiment. More particularly, air under pressure is introduced into the hollow interior of bladder 150 to enable bladder 150 to press against fiber architecture 156 even more tightly to ensure even better distribution of resin throughout said fiber architecture. This invention is therefore understood to include negative pressure outside of the bladder to cause it to expand, positive pressure inside the bladder to cause it to expand, or any combination of such negative and positive pressures.

FIG. 14 provides a detailed view of axle/nozzle assembly 146 that delivers resin to the fiber architecture that is sandwiched between the bladder and the mold. Nozzle assembly 146 has utility in connection with any of the above-disclosed embodiments.

Fiber architecture 156 and bladder 150 are displaced by piston 172 to separate said fiber architecture from mold 136 having parts 136a and 136b. This creates cavity 174 into which resin is injected. The resin is pushed through porous fiber architecture 156 by the bladder that expands under the vacuum supplied at each micro perforation 137.

Although the invention will work with only one (1) micro perforation, it will also work with a plurality of micro perforations. If two (2) micro perforations are used, they are optimally positioned in diametrically opposed relation to one another. If more than two (2) micro perforations are used, they should be equidistantly spaced from one another.

The spinning of the mold about its axis of rotation creates centrifugal force that also pulls bladder and the resin radially outwardly so that the fiber architecture 156 becomes saturated with resin first along its radially outermost part and said resin gradually increases in thickness as it accumulates radially inwardly until the radially innermost surface of the fiber architecture, i.e., the surface abutting expanded bladder 150, is saturated.

When the fiber architecture is saturated with resin, a nominal amount of said resin will enter into micro perforations 137 but resin will not flow through said micro perforations.

If catalyzed resin is injected into the fiber architecture through resin injection port 92a opened by piston 172, said resin will cure and plug the port when it stops flowing, preventing driving shaft 146 from rotating and therefore requiring replacement of driving shaft 146 after each molding procedure.

To overcome such problem, a first bore 94a, known in the industry as a gallery and depicted in FIG. 14, is formed in the driving shaft and is dedicated to the flow of hydraulic fluid. Bore 94a is in open fluid communication with chamber 176 having piston 178 slideably mounted therein and a bias means such as coil spring 180 for maintaining piston 178 in a retracted configuration when no hydraulic fluid is present. Spring 180 is compressed as depicted when hydraulic fluid enters into chamber 176 as denoted by the unnumbered arrow in said chamber, and said displacement of said piston causes conjoint displacement of valve 172.

Second gallery 92a carries resin from a remote source of resin.

Third gallery 92b is formed in said driving shaft and carries catalyst from a remote source of catalyst.

Fourth gallery 92c carries acetone from a remote source of acetone.

Fifth gallery 92d carries compressed air.

Sixth gallery 92e carries acetone and the catalyzed resin dissolved by it to a remote collection tank for such acetone and dissolved catalyzed resin. Note that the direction of flow in sixth gallery 92e is opposite to the flow direction in galleries 94a, and 92a-92d.

The galleries dedicated to the flow of in-bound resin, catalyst, and acetone terminate at their respective distal ends in mixer head 182 positioned in a countersunk recess formed in the radially innermost end of driving shaft 146.

The countersunk recess is closed by valve 172 when no resin is flowing into the fiber architecture.

When bladder 150 is fully expanded, valve 172 opens and resin and catalyst are introduced into mixer head 182 where their intermixing takes place just prior to entering into the fiber architecture. In this way, there is no catalyzed resin in any gallery.

Each gallery is an annular bore having a gradual ninety degree (90°) bend formed therein, i.e., having a relatively short radial part and a longitudinally extending part as depicted in FIG. 14. Driving shaft/nozzle 146 spins about its longitudinal axis of symmetry as indicated by rotational arrow 184, but the resin, catalyst, and acetone sources, and the acetone collection receptacle as well, are stationary and do not spin. Annular sealing or wiper blades, collectively denoted 93, conform to the curvature of driving shaft 146.

Bladder 150 is easily contained by spherical mold 136 or by many other molds of non-spherical shape. However, holding the bladder is problematic in applications like the first embodiment where an elongate bladder is subjected to high centrifugal forces along its longitudinal axis.

Figure 15:
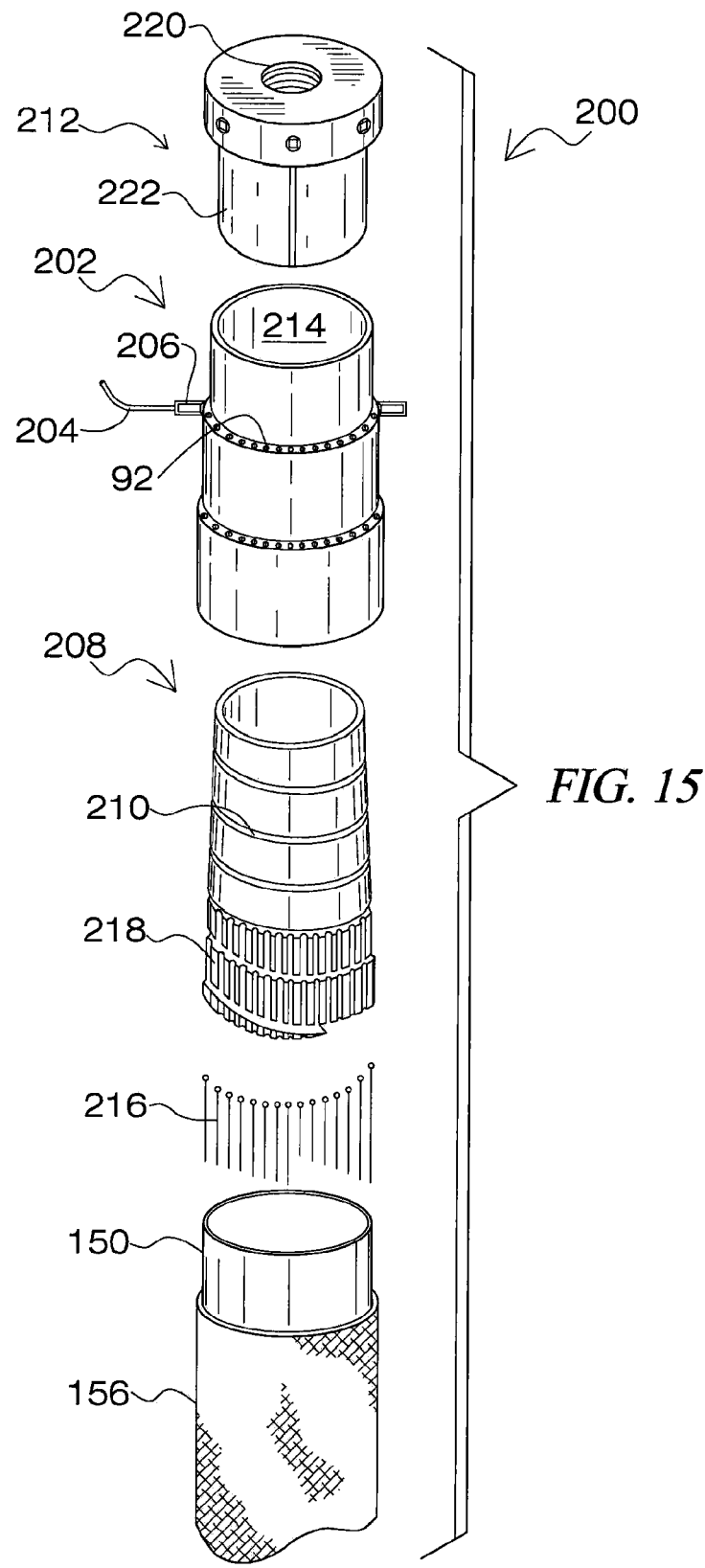
FIG. 15 is an exploded perspective view of a novel bladder holding means having utility in connection with the first three embodiments.

A bladder holding means 200, depicted in exploded view in FIG. 15, is required to prevent the centrifugal force acting on the mold from pulling the bladder radially outwardly until it separates from its mount. Bladder holding means 200 may take many forms which become obvious after the basic structure is disclosed.

Bladder-holding structure 200 includes rigid exterior sleeve 202 having a resin feed tube 204 and a resin coupler 206. Items 204 and 206 do not rotate with the bladder and the bladder holding means 200.

Structure 200 further includes rigid interior sleeve 208 having a plurality of longitudinally and equidistantly spaced apart circumferential grooves 210 formed therein and resin injection nozzle 212.

Resin injection nozzle 212 is an expandable chuck and is internally threaded as at 220 so that it can be secured against movement. Its neck 222 is inserted into lumen 214 of external sleeve 202 and into the lumen of bladder 150 because an extent of said bladder 150 extends from fiber architecture 156 as depicted at the bottom of FIG. 15. Accordingly, expanding the chuck strongly captures the radially innermost end of bladder 150.

It should be understood, however, that the primary extent of bladder 150 extends free of confinement within mold 20. Bladder holding means 200 engages just the radially inner end of said bladder and fiber architecture 156 to hold said items when centrifugal forces become great.

When the assembly is complete, interior sleeve 208 is ensleeved within the lumen of bladder 150 and said bladder 150 and fiber architecture 156 are ensleeved with lumen 214 of exterior sleeve 202. Accordingly, the respective radial inner ends of bladder 150 and fiber architecture 156 are sandwiched between exterior sleeve 202 and interior sleeve 208. Annular sections of bladder 150 thus are pressed into grooves 210 to increase the amount of friction between them.

There are a number of other parts that are also sandwiched between the exterior and interior sleeves such as a plurality of parallel, circumferentially spaced resin feed tubes 216 that are disposed in longitudinal grooves 218 and which deliver resin along the length of the completed assembly. The number of other parts and the order in which they are arranged depends upon whether the resin feed tubes 216 are cast in place or not cast in place.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A mold assembly, comprising:
  a support table mounted for rotation about a central axis of rotation;
  a plurality of hollow part molds mounted on said support table and disposed in circumferentially spaced relation to one another in radial relation to said central axis of rotation;
  a flexible and expandable bladder disposed in a hollow interior of each of said part molds;
  said bladder having an open radially innermost end and a closed radially outermost end;
  a preselected fiber architecture respectively disposed in a hollow interior of each of said part molds between said respective bladders and interior walls of said part molds;
  said preselected fiber architecture being porous to air;
  each of said hollow part molds including a top piece and a bottom piece that abut one another along a parting line when placed into confronting relation to one another, said top and bottom pieces adapted to be releasably secured to one another;
  a resin reservoir adapted to deliver resin to respective hollow interiors of said mold parts so that said resin flows into said fiber architecture, radially outwardly of said respective bladders;
  whereby rotation of said support table causes resin in said fiber architecture to flow radially outwardly relative to said support table axis of rotation;
  whereby a finished molded product having a monolithic, seamless structure is produced, substantially free of voids; and
  whereby said finished molded product is removed from its part mold by separating each part mold top piece from each part mold bottom piece.

2. The mold assembly of claim 1, further comprising:
  a stationary vacuum chamber;
  said resin reservoir positioned externally of said stationary vacuum chamber;
  a support table motor mounted outside of said stationary vacuum chamber;
  said support table motor including a drive shaft that defines said axis of rotation of said support table;
  at least one micro perforation formed in each of said part molds so that a vacuum in said vacuum chamber is in fluid communication with said bladder through said fiber architecture;
  whereby a vacuum in said vacuum chamber causes expansion of said bladder so that said bladder presses said fiber architecture against said internal walls of said part mold.

3. The mold assembly of claim 2, further comprising:
  a plurality of part mold motors mounted inside said stationary vacuum chamber, each motor of said plurality of part mold motors being associated with a part mold and being adapted to cause rotation of an associated part mold about an axis of rotation of said associated part mold;
  whereby rotation of each part mold about its axis of rotation causes resin in said fiber architecture to flow radially outwardly with respect to said axis of rotation of each part mold.

4. The mold assembly of claim 3, further comprising:
  each of said part mold motors having an output shaft and a pinion gear secured to said output shaft for conjoint rotation therewith;
  a part mold ring gear associated with each part mold such that rotation of said part mold ring gear effects conjoint rotation of said part mold;
  said part mold ring gear disposed in meshing engagement with said pinion gear so that operation of said part mold motor effects rotation of its associated part mold about the axis of rotation of said part mold.

5. The mold assembly of claim 1, further comprising:
  said drive shaft having a plurality of bores formed therein for carrying liquid and gaseous fluids including resin, compressed air, and hydraulic fluid under pressure;
  a plurality of non-rotating couplers and shaft seals providing an interface between stationary sources of said liquid and gaseous fluids and said rotating drive shaft.

6. The mold assembly of claim 1, further comprising:
a bladder holding means positioned at the radially innermost end of each bladder to hold its associated bladder against radially outward movement caused by centrifugal force.

7. The mold assembly of claim 1, further comprising:
a nozzle assembly disposed in fluid communication between said resin reservoir and said radially innermost end of each part mold;
said nozzle assembly including a valve and a piston for operating said valve;
said piston-operated valve when opened by said piston abutting against and displacing said fiber architecture to form a cavity within said part mold into which resin flows for as long as said valve is open so that a measured amount of resin is introduced into said part mold.

8. The mold assembly of claim 7, further comprising:
said valve including an elongate valve stem;
said valve including a mixing head;
a plurality of bores formed in said elongate valve stem;
a first bore of said plurality of bores disposed in fluid communication with a source of hydraulic fluid;
a second bore of said plurality of bores disposed in fluid communication with said resin reservoir;
a third bore of said plurality of bores disposed in fluid communication with a catalyst reservoir;
a fourth bore of said plurality of bores disposed in fluid communication with a solvent that dissolves resin;
a fifth bore of said plurality of bores disposed in fluid communication with a source of air under pressure;
a sixth bore of said plurality of bores disposed in fluid communication with a collection receptacle;
whereby said first bore delivers hydraulic fluid to operate said piston;
whereby said second bore delivers resin to said mixing head;
whereby said third bore delivers catalyst to said mixing head;
whereby said fourth bore delivers solvent into said mixing head to dissolve catalyzed resin that collects in said mixing head;
whereby said fifth bore delivers compressed air to said mixing head;
whereby said sixth bore delivers dissolved resin from said mixing head to said collection receptacle.

9. A mold assembly, comprising:
a support table mounted for rotation about a central axis of rotation;
a support table motor including a drive shaft that defines said axis of rotation of said support table;
a plurality of hollow part molds mounted on said support table and disposed in circumferentially spaced relation to one another in radial relation to said axis of rotation;
a housing dedicated to each of said part molds being mounted on said support table in housing relation to its associated part mold;
each of said housings being in valved fluid communication with a vacuum source so that a vacuum may be established on demand in each of said housings;
a flexible and expandable bladder disposed in a hollow interior of each of said part molds;
each of said bladders having an open radially innermost end and a closed radially outermost end;
a preselected fiber architecture respectively disposed in a hollow interior of each of said part molds between said respective bladders and interior walls of said part molds;
said preselected fiber architecture being porous to air;
each of said hollow part molds including a top piece and a bottom piece that abut one another along a parting line when placed into confronting relation to one another, said top and bottom pieces adapted to be releasably secured to one another;
a resin reservoir adapted to deliver resin to respective hollow interiors of said mold parts so that said resin flows into said fiber architecture, radially outwardly of said respective bladders;
at least one micro perforation formed in each of said part molds so that a vacuum in said housing is in fluid communication with said bladder through said fiber architecture;
whereby a vacuum in said housing causes expansion of said bladder so that said bladder presses said fiber architecture against said internal walls of said part mold;
whereby rotation of said support table causes resin in said fiber architecture to flow radially outwardly relative to said support table axis of rotation;
whereby a finished molded product having a monolithic, seamless structure is produced, substantially free of voids; and
whereby said finished molded product is removed from its part mold by separating each part mold top piece from each part mold bottom piece.

10. The mold assembly of claim 9, further comprising:
a part mold motor mounted inside each of said housings, each of said motors being associated with a part mold and being adapted to cause rotation of an associated part mold about an axis of rotation of said associated part mold;
whereby rotation of each part mold about its axis of rotation causes resin in said fiber architecture flow radially outwardly with respect to said axis of rotation of each part mold.

11. The mold assembly of claim 10, further comprising:
each of said part mold motors having an output shaft and a pinion gear secured to said output shaft for conjoint rotation therewith;
a part mold ring gear associated with each part mold such that rotation of said part mold ring gear effects conjoint rotation of said part mold;
said part mold ring gear disposed in meshing engagement with said pinion gear so that operation of said part mold motor effects rotation of its associated part mold about the axis of rotation of said part mold.

12. The mold assembly of claim 9, further comprising:
said support table being mounted for rotation in a horizontal plane about a vertical axis.

13. The mold assembly of claim 9, further comprising:
said support table being mounted for rotation in a vertical plane about a horizontal axis.

14. A mold assembly, comprising:
a hollow mold of predetermined geometrical configuration mounted for rotation about a central axis of rotation;
said hollow mold having a first part and a second part that are releasably joined to one another along a parting line to form said hollow mold;
a flexible and expandable bladder positioned within a hollow interior of said hollow mold, said bladder having a predetermined geometrical configuration conforming to the predetermined geometrical configuration of said hollow mold;
a preselected fiber architecture disposed in the hollow interior of said hollow mold between said bladder and interior walls of said hollow mold;

a resin reservoir positioned externally of said hollow mold, said resin reservoir adapted to deliver resin to the hollow interior of said hollow mold so that said resin flows into said fiber architecture, radially outwardly of said bladder;

whereby rotation of said support table causes resin in said fiber architecture to flow radially outwardly relative to said support table axis of rotation;

whereby a finished molded product having a monolithic, seamless structure is produced, substantially free of voids; and whereby said finished molded product is removed from its part mold by separating each hollow mold first part from each hollow mold second part.

15. The mold assembly of claim 14, further comprising:
a vacuum chamber;
said hollow mold positioned within a hollow interior of said vacuum chamber;
said preselected fiber architecture being porous to air;
at least one micro perforation formed in said hollow mold so that a vacuum in said vacuum chamber is in fluid communication with said bladder through said fiber architecture;

whereby a vacuum in said vacuum chamber causes expansion of said bladder so that said bladder presses said fiber architecture against said internal walls of said hollow mold;

whereby a finished molded product of predetermined geometric configuration having a monolithic, seamless structure is produced, substantially free of voids; and whereby said finished molded product is removed from the hollow mold by separating each hollow mold top piece from each hollow mold bottom piece.

* * * * *